United States Patent

Bailey et al.

Patent Number: 5,232,082
Date of Patent: Aug. 3, 1993

[54] PINLESS BELT FEEDER

[75] Inventors: Bertice E. Bailey, Mechanicsville; William R. Sweeney, Richmond, both of Va.

[73] Assignee: Philip Morris Incorporated, New York, N.Y.

[21] Appl. No.: 826,836

[22] Filed: Jan. 28, 1992

[51] Int. Cl.⁵ .............................. B65G 43/00
[52] U.S. Cl. .................. 198/502.2; 414/295; 414/299; 414/327; 198/502.3; 198/524; 198/562
[58] Field of Search ............. 198/502.2, 502.3, 524, 198/562, 573; 193/6; 414/295, 299, 300, 327

[56] References Cited

U.S. PATENT DOCUMENTS

| 881,429 | 3/1908 | De Mayo | 193/6 |
|---|---|---|---|
| 1,907,089 | 3/1933 | Pabst . | |
| 2,109,139 | 2/1938 | Pardee . | |
| 2,136,560 | 11/1938 | Nichols . | |
| 2,599,659 | 6/1952 | Phillips et al. | 198/535 |
| 2,675,120 | 4/1954 | Autenrieth et al. . | |
| 3,057,454 | 10/1962 | Frasch et al. | 198/535 |
| 3,062,355 | 11/1962 | Sawada . | |
| 3,393,791 | 7/1968 | Heitzer | 198/535 X |
| 3,528,538 | 9/1970 | Quester . | |
| 3,550,752 | 12/1970 | Gregor . | |
| 3,631,961 | 1/1972 | Strydom | 198/524 |
| 3,780,886 | 12/1973 | Allen . | |
| 3,836,021 | 9/1974 | McWilliams . | |
| 3,889,796 | 6/1975 | Baily et al. . | |
| 3,927,758 | 12/1975 | Gregor . | |
| 4,094,399 | 6/1978 | George . | |
| 4,646,910 | 3/1987 | Johanson et al. | 198/535 |
| 4,832,172 | 5/1989 | Roberto | 198/524 X |
| 4,948,321 | 8/1990 | Wilding et al. . | |

FOREIGN PATENT DOCUMENTS 0032564  3/1978  Japan .................. 198/524

Primary Examiner—D. Glenn Dayoan

[57] ABSTRACT

This invention relates to a device for volumetric flow control of particulate and fiber-like materials, specifically tobacco. More particularly, this invention relates to an apparatus having a contractible chute or a tilting conveyor. The discharge end of the chute or conveyor travels across the top of a container space, building an even pile of tobacco. When the level of tobacco in the container space reaches a certain height, a device signals the chute or tilting conveyor and the discharge end of the chute or conveyor moves rearward. When the moving conveyor floor of the container space moves the pile of tobacco forward, one or two devices signal the chute or tilting convey or, and the discharge end of the chute or tilting conveyor moves forward. The effect of this rearward and forward movement of the chute or tilting conveyor is to maintain volumetric control over the tobacco contained within the container space.

7 Claims, 5 Drawing Sheets

PINLESS BELT FEEDER

BACKGROUND OF THE INVENTION

This invention relates to a device for maintaining volumetric flow control of particulate and fiber-like materials. The invention is particularly well suited to transport of high moisture finely sliced plant products such as tobacco. More particularly, this invention relates to an apparatus having a contractible chute or a tilting conveyor. The discharge end of said chute or conveyor travels across the top of an open bin. The chute or conveyor feeds product evenly into the bin, thereby building an even pile of product.

Present devices used to maintain volumetric flow control of tobacco do not utilize a contractible chute or tilting conveyor. Present devices typically employ a series of conveyor belts, some traveling in an inclined direction.

An inclined conveyor belt may utilize multiple finger-like shafts projecting from the belt called "pins." Such a belt is called a pin belt feeder. As the belt moves, these pins engage the cohering moist tobacco and organize a flow. A wheel with projecting pins may be positioned above the inclined belt rotating against the direction of the belt, combing excess tobacco off the top of the pile.

These presently used pin belt feeders have many drawbacks. For example, the pins impose sheer forces on the tobacco while engaging it. These shear forces reduce the size and quality of the individual strands, thus diminishing or destroying some of the tobacco. The pins also act to physically compact the high moisture cohering tobacco and cause clumping. Furthermore, the pins occasionally break away or dislodge from their positions, eventually becoming caught in pinch points, causing damage to the machinery. The pins also preclude the use of automatic cleaning apparatus and thus complicate maintenance and cleaning of the feeder device.

Therefore, it would be desirable to replace these pin belt feeders with a pinless belt feeder to prevent tobacco breakage, compaction and clumping resulting from the action of the pins. A pinless belt feeder would not sustain damage due to broken pins and would accommodate the use of automatic cleaning devices.

SUMMARY OF THE INVENTION

In view of the foregoing, it is an object of the invention to provide a device which does not utilize pins for transporting a uniform volumetric flow of tobacco.

It is a further object to provide a device for transport and volumetric flow control of tobacco which requires minimal labor and maintenance.

It is a further object to provide a device for transport and volumetric flow control of tobacco which minimizes damage to, and clumping of, the tobacco.

It is a further object to provide a device for transport and volumetric flow control of tobacco which occupies a minimal amount of space.

These and other objects of the invention are accomplished by providing a device which includes a contractible downward sloping chute, with a fixed pivot point at the top of the slope, and a movable discharge end at the bottom of the slope. The chute includes two or more telescoping stages or sections slidably nested within one another thus conserving space. Each stage slides over or under the next as the movable discharge end of the chute changes position causing the chute to contract or extend.

These and other objects of the invention are likewise accomplished by providing a device which includes a tilting conveyor capable of movement in an arcuate manner such that the forward discharge end of the tilting conveyor moves forward as the rearward end moves downward, and the forward end moves rearward as the rearward end moves upward.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE PREFERRED EMBODIMENTS

Figure 1:
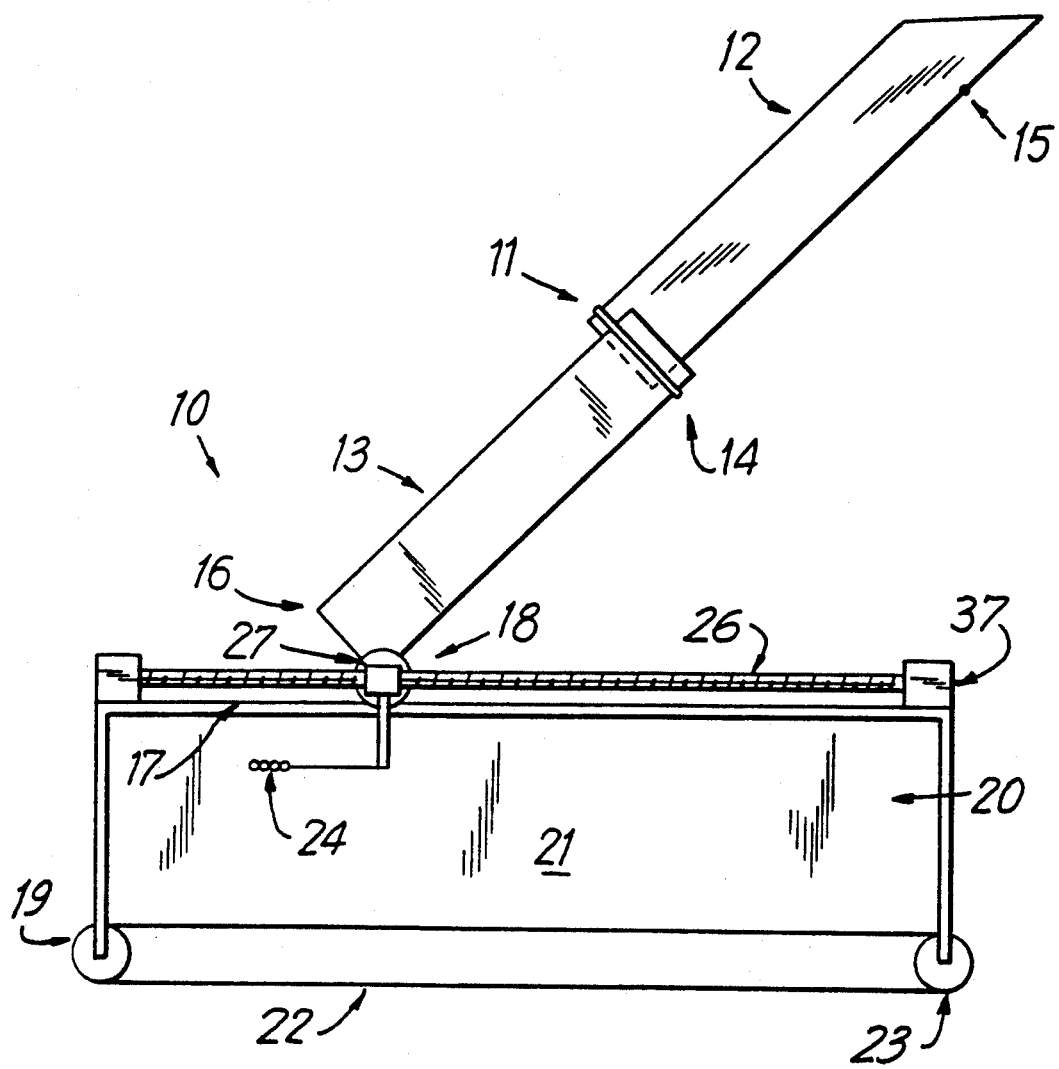
FIG. 1 is a side view of a preferred embodiment of the apparatus illustrating diagrammatically the basic relationship among the several parts of the apparatus.

Referring now to the drawings, FIG. 1 illustrates the device designated generally by the reference number 10. Device 10 includes a chute 11 which includes a plurality of telescoping sections 12 and 13, slidable nested within one another. The bottom section 13 slides under the top section 12 as chute 11 contracts or extends. Sections 12 and 13 of chute 11 are attached by support band 14. As the length of chute 11 expands and contracts, the chute pivots around a pivot point 15.

Figure 2:
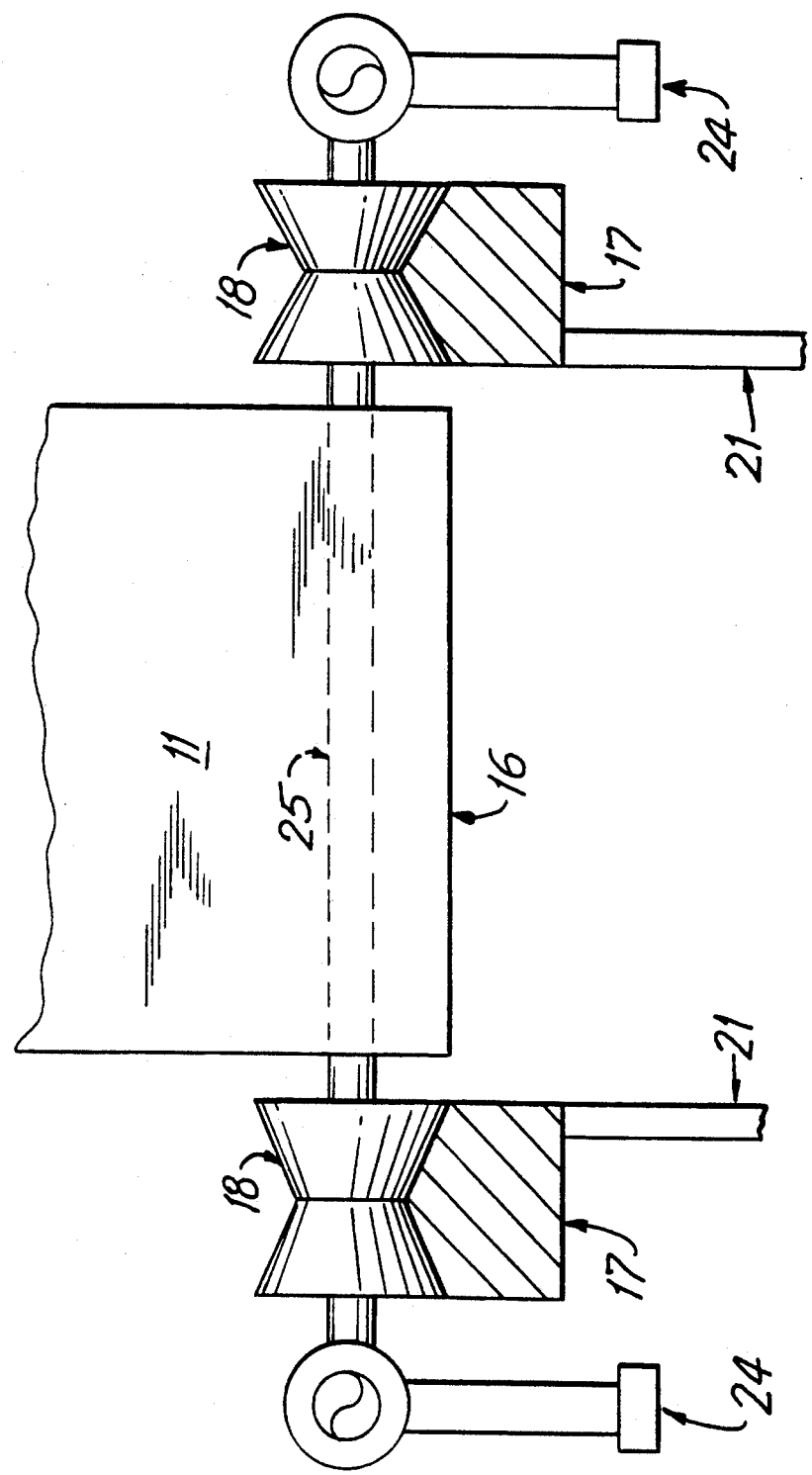
FIG. 2 is a frontal view in fragmentary form of the apparatus of FIG. 1, illustrating the basic relationship of the chute to the rollers and guide rails.

The discharge end 16 of chute 11 is attached to at least one shaft 25 (represented in FIG. 2). The shaft engages with at least two rollers 18, one on either side of chute 11. Said rollers 18 engage with tracks 17, thus securely retaining chute 11 in position.

The discharge end 16 of chute 11 moves horizontally along track 17. Gearbox 37 powers this movement by turning positioning screw 26 which is positioned on the horizonal axis. Screw 26 engages with receiving nut 27 which is fixed directly or indirectly to discharge end 16 of chute 11. As screw 26 turns, receiving nut 27 moves along the horizontal axis of the screw, moving the attached discharge end 16 of chute 11 with it. As the discharge end 16 of chute 11 moves, chute 11 expands and contracts.

Directly under the discharge end 16 of chute 11 is a container space 20 with sides 21 for containing the material. Container space 20 will contain product, such as chopped tobacco, which drops from discharge end 16 of chute 11. The floor of the container space 20 is a transport belt device 19. Transport belt device 19 includes at least one continuous belt 22 which turns around a plurality of transport belt pulleys 23. At least one of said transport belt pulleys 23 drives transport belt 19. Transport belt pulleys 23 also provide tension and position for belt 22.

A level sensing device 24, which includes an emitter and a receiver, is attached directly or indirectly to the discharge end 16 of chute 11. The level sensing device 24 travels with the discharge end 16 of chute 11 outside the sides 21 enclosing container space 20. The sides 21 admit passage of the signal emitted by emitter 24. (both the emitter and the receiver are represented as 24 as their positions are interchangeable). The emitter 24 projects a signal beam (not in drawings) through side 21, across container space 20, and then through the other side 21, before the beam is received by the receiver 24. The receiver 24 and emitter 24 detect the level of tobacco in space 20, and the movement of that tobacco.

As the level of product contained within container space 20 builds, it eventually reaches a height sufficient to interrupt the signal beam projected by the level sensing device 24. The device then sends a signal to gearbox 37, which turns the positioning screw 26, which engages the receiving nut 27, causing it to move rearward along the axis of the positioning screw 26. As nut 27 is attached to the discharge end 16 of chute 11, the discharge end 16 moves rearward with the receiving nut. As discharge end 16 of chute 11 moves rearward, the bottom section 13 slides under the top section 12 causing chute 11 to contract.

Figure 5:
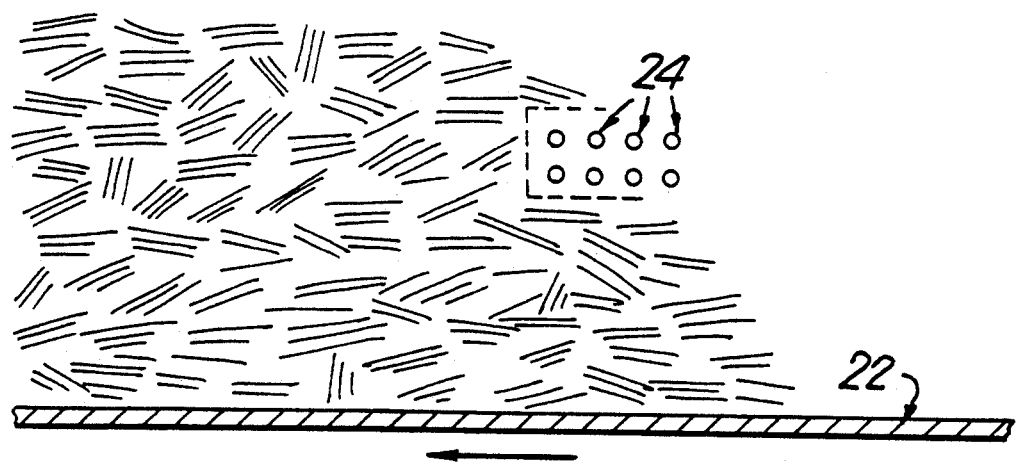
FIG. 5 is a side view in fragmentary form illustrating the relationship between the pile and the multiple sensors as the pile moves forward on the transport belt.

Furthermore, when transport belt 19 moves the tobacco contained in container space 20 forward toward discharge end 29, the level sensors 24 can detect the forward motion. Utilizing multiple receivers 24 (see FIG. 5) the level sensing device detects a changing pattern of signal beam interruption, feeding this information to a computer (not shown) which interprets the changing pattern. When this pattern reflects the forward movement of the pile, the computer signals the gearbox 37, which turns the positioning screw 26, which engages the receiving nut 27, causing it to move forward along the axis of the positioning screw 26. As nut 27 is attached to the discharge end 16 of chute 11, the discharge end 16 moves forward with the receiving nut 27. As discharge end 16 of chute 11 moves forward, the bottom section 13 slides forward causing chute 11 to extend.

Likewise, when belt conveyor 19 moves the tobacco contained in container space 20 forward toward the discharge end 29, a shaft encoder 38 which may be located in proximity to a transport belt pulley 23 detects the forward motion. The shaft encoder then signals gearbox 37 initiating the same sequence of events, eventually resulting in the chute extending.

Figure 3:
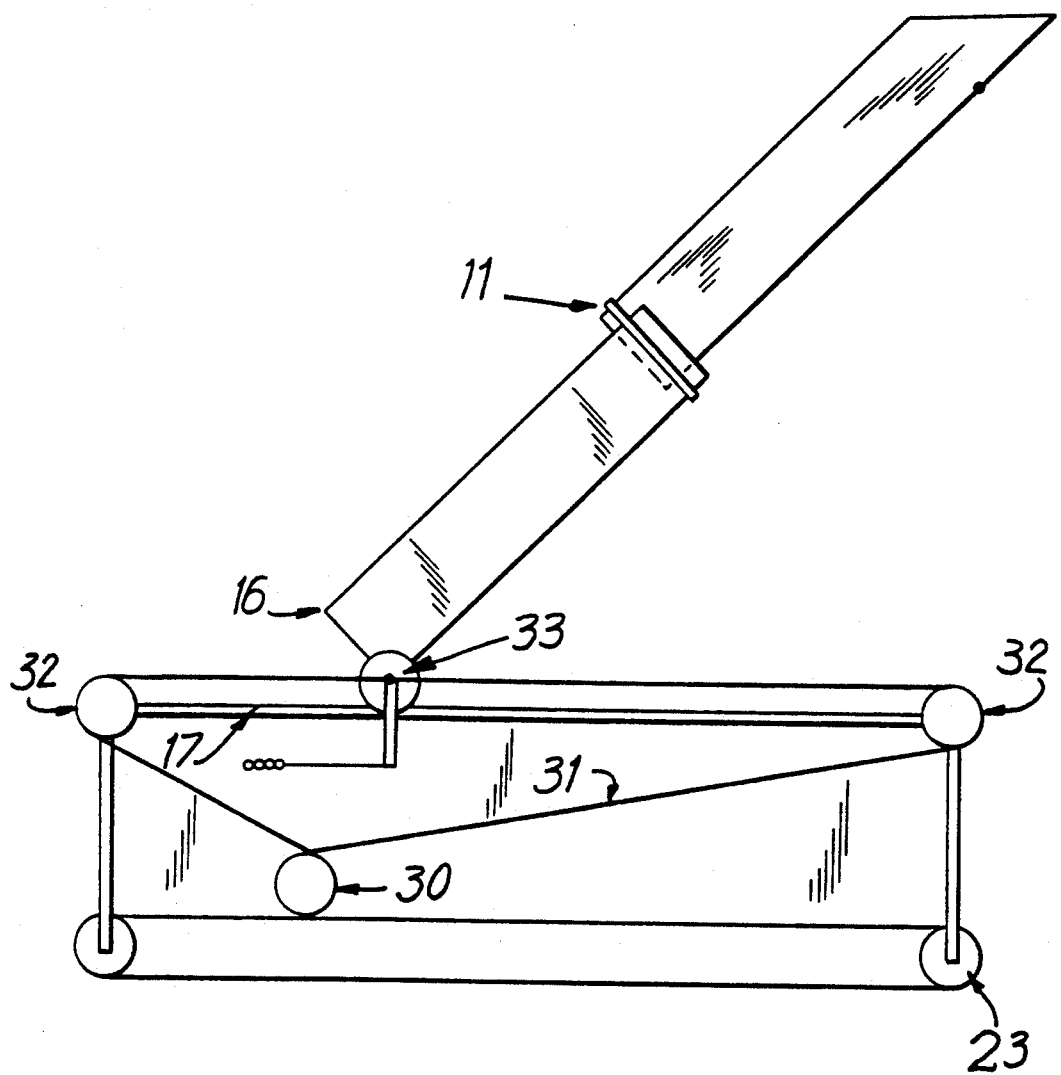
FIG. 3 is a side view of an alternative embodiment for the apparatus illustrating diagrammatically the basic relationship among the several parts of the apparatus.

An alternative embodiment (represented in FIG. 3) involves the present invention precisely as described, less the gearbox 37, the positioning screw 26, and the receiving nut 27. In this embodiment, the chute 11 is empowered to extend and retract by a D.C. servo control 30. The D.C. servo control 30 is attached to a cable 31 which travels around pulleys 32 located at forward and rearward positions of the track 17. Cable 31 attaches directly or indirectly to the discharge end 16 of chute 11. In this arrangement, the D.C. servo control 30 turns in response to signals from level sensing device 24 and the shaft encoder (not shown) thereby moving the discharge end 16 of chute 11 forward and rearward, and extending and contracting the chute.

The D.C. servo control acts to extend and retract the chute like the gearbox 37 positioning screw 26 arrangement, in response to the same signals from the shaft encoder and the level sensing device 24. In both the gearbox 37 and the D.C. servo control 30 embodiments, the effect of this extension and contraction movement of the chute 11 over container space 20 is to maintain volumetric control of the tobacco contained within the container space 20.

Figure 4:
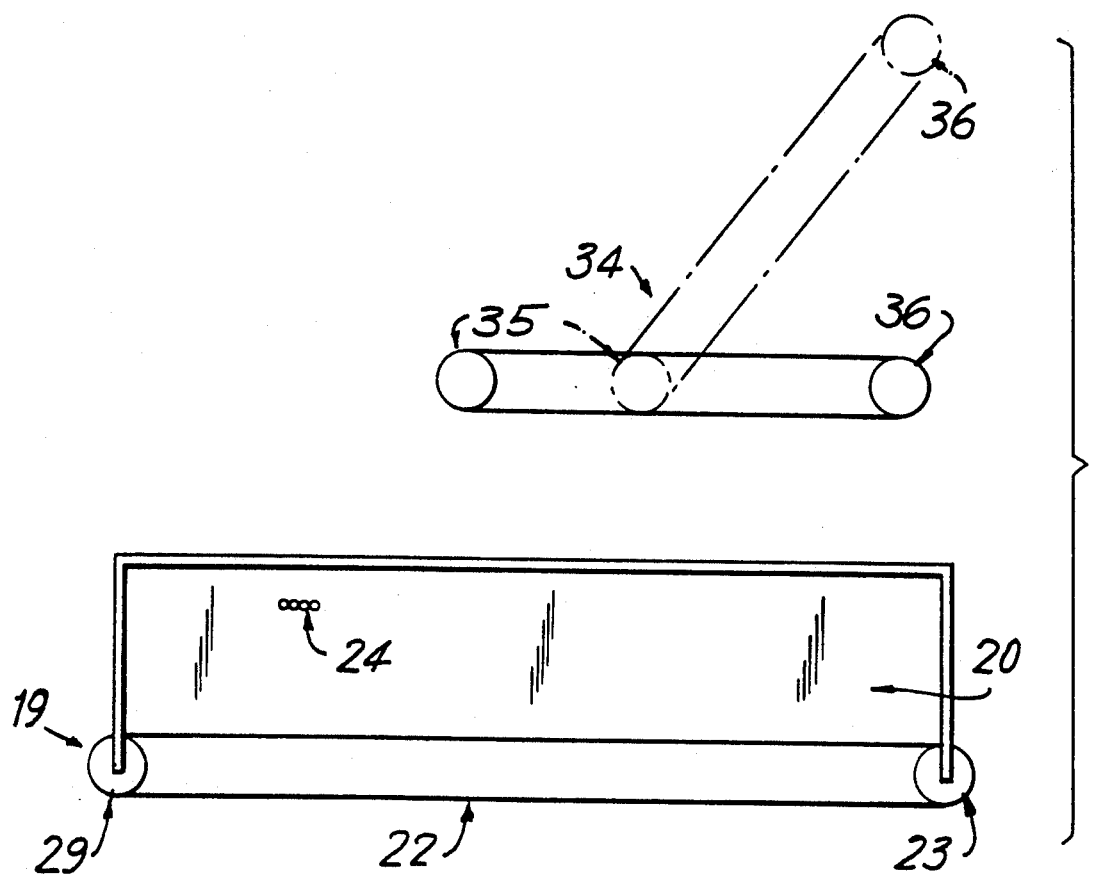
FIG. 4 is a side view of an alternative embodiment for the apparatus illustrating diagrammatically the basic relationship among the several parts of the apparatus.

Another embodiment (represented in FIG. 4) involves the present invention as described, less the chute 11. In this embodiment, a tilting conveyor 34 moves in an arcuate pattern in the vertical plane over container space 20. The tilting conveyor 34 moves in response to signals from the level sensing device 24, and the shaft encoder (not shown). The forward discharge end 35 of tilting conveyor 34 moves forward as the angle of incline of the tilting conveyor 34 decreases, and rearward, as the angle of incline of the tilting conveyor 34 increases.

When the level of product contained within container space 20 reaches a height sufficient to interrupt the signal beam projected by the level sensing device 24, the device sends a signal to the tilting conveyor 34. This signal causes the angle of incline of tilting conveyor 34 to increase and the forward discharge end 35 to move rearward.

When transport belt 19 moves the tobacco contained in container space 20 forward toward the discharge end 29 of belt conveyor 19, the multiple receivers 24 of the level sensing device detects the changing pattern of signal beam interruption. The level sensing device 24 sends this information to a computer (now shown) which signals the tilting conveyor 34. This signal causes the angle of incline of tilting conveyor 34 to decrease and the discharge end 35 to move forward.

Likewise a shaft encoder attached to a transport belt pulley 23 detects the forward motion. The shaft encoder then signals the tilting conveyor 34, causing the angle of incline of tilting conveyor 34 to decrease and the forward discharge end 35 to move forward.

The effect of this forward and rearward movement of the discharge end 35 of the tilting conveyor 34 over container space 20 is to maintain volumetric control over the tobacco contained within the container space 20.

Although this application refers to tobacco throughout, it is to be understood that the invention is similarly useful for any other high moisture or highly friable or breakable or degradable sliced vegetable or plant product.

One skilled in the art will appreciate that the present invention can be practiced by other than the described embodiments, which are presented for purposes of illustration and not of limitation and the present invention is limited only by the claims which follow.

We claim:

1. An apparatus for transport of finely sliced vegetable or plant product comprising a chute which can expand and contract in length thereby changing the position of the discharge end of the chute, a means to expand and contract said chute and at least one transport belt which receives the discharge from the chute and which travels around and between a plurality of transport belt pulleys, wherein:
   a) said chute comprises a plurality of separate sections wherein at least one section overlaps and nests with another section;

b) the discharge end of said chute is positioned between a plurality of rollers that run on tracks;

c) the discharge end of said chute is attached to at least one threaded connector adapted to communicate with a positioning screw that is attached to a gear box, so that the gearbox turns the positioning screw that drives the threaded connector which in turn moves the discharge end of said chute along the axis of the positioning screw; and d) the discharge end of said chute is attached to at least one level sensing device, and said level sensing device sends signals causing said gearbox to drive the discharge end of said chute and thereby expand or contract said chute.

2. The apparatus according to claim 1 wherein the chute extends as the discharge end moves forward, and contracts as the discharge end moves rearward.

3. The apparatus according to claim 1 wherein a shaft attached to a belt conveyor pulley is attached to at least one shaft encoder, and that shaft encoder signals the gearbox causing said gearbox to drive the discharge end of the chute and thereby expand the chute.

4. The apparatus according to claim 1 wherein the discharge end of the chute is attached to at least one cable which is attached to a D.C. servo control mechanism so that so the D.C. servo control mechanism turns, the cable drives the discharge end of the chute.

5. The apparatus according to claim 4 wherein the discharge end of the chute is attached to at least one level sensing device, and the level sensing device sends signals causing the D.C. servo control mechanism to drive the discharge end of the chute and thereby expand or contract the chute.

6. The apparatus according to claim 4 wherein a shaft mounted to the discharge end of the chute is attached to at least one shaft encoder, and that shaft encoder signals the D.C. servo control mechanism causing said D.C. servo control mechanism to drive the discharge end of the chute and thereby expand the chute.

7. The apparatus according to claim 1 wherein the finely sliced vegetable or plant product is tobacco.

* * * * *